Feb. 16, 1971 S. SOLOWAY ET AL 3,563,660
METHOD AND APPARATUS FOR DETERMINING PARTICLE SIZE AND SHAPE
Filed March 2, 1967 7 Sheets-Sheet 1

INVENTORS.
Sidney Soloway
Warren G. Gillingham
BY
THEIR ATTORNEYS

INVENTORS.
Sidney Soloway
Warren G. Gillingham

THEIR ATTORNEYS

INVENTORS.
Sidney Soloway
Warren G. Gillingham
BY
THEIR ATTORNEYS

United States Patent Office 3,563,660
Patented Feb. 16, 1971

3,563,660
METHOD AND APPARATUS FOR DETERMINING PARTICLE SIZE AND SHAPE
Sidney Soloway and Warren G. Gillingham, Pittsburgh, Pa., assignors to Fisher Scientific Company, Pittsburgh, Pa., a company of Pennsylvania
Filed Mar. 2, 1967, Ser. No. 620,028
Int. Cl. G01n *15/02, 21/00;* G01b *11/28*
U.S. Cl. 356—102                                13 Claims

ABSTRACT OF THE DISCLOSURE

An apparatus and method for determining the size and shape of small particles. Light scattered by each particle is focused to form an image; a photomultiplier then converts the light into a pulse of current that varies with size of the particle. The size and shape of the image can be measured mechanically with slit gates. A decrease in the voltage generated by the particles results when the slit gates contact the image.

This invention relates to an apparatus and method for determining the size and shape of small particles. Specifically, it relates to the use of slit gates separated by a known distance which are positioned at the focus of particle images.

It is often very important to know the size and shape of microscopic particles. The particles may be red blood cells and their size and shape may indicate various diseases, the particles could be air or water pollutants where size and shape would identify the particle and its toxicity and indicate how it can be removed, or the particles could be any of a wide variety of particles of industrial importance such as latex particles in paint, where size and shape may determine the quality of the paint.

Many varieties of apparatus have been made to determine particle size. These apparatuses function by measuring some property which is proportional to particle size. For example, they may measure the settling rate of particles in a solution, the speed of charged particles in an electrical field, the permeability of a porous plug of compressed particles, the amount of light scattered by individual particles, or other properties.

Particle "size" means the size as determined by the method used; different methods may agree fairly well. "Size" as determined by measuring the amount of light scattered by a particle may be considered to be an average diameter of the area of the light-emitting surface of the particle.

The amount of light scattered by a particle, however, depends upon other properties of particles besides their size. For example, white particles scatter more light than black particles, shiny particles scatter more than dull particles, etc. To eliminate the effects of these other properties, it was necessary to have a set of standard samples for each particular type of particle.

That is, by other means one first determined the size of different-sized samples of a certain type of particle. A comparison was then made between the amount of light scattered by a sample of unknown particle size and the amount scattered by each of the known samples. Obtaining such a set of standards is a cumbersome and time-consuming task.

Moreover, the determination of the particle size by that method is not very precise since the precision of the standard set may not be high, all the other properties affecting the amount of light scattered may not have been eliminated, and the unknown sample may fall somewhat in between the known samples.

We have invented a method and apparatus for determining particle size which is not significantly affected by the light scattering properties of particles other than the property of particle size. The color of the particle, whether it is shiny or dull, etc. will not significantly influence a determination of its size under our invention. Thus, it is not necessary to obtain a set of standards. In addition, our methods are inherently more precise in that they are capable of far greater resolution.

An understanding of our invention may be acquired by referring to the accompanying drawings.

Figures 1, 3, 4:
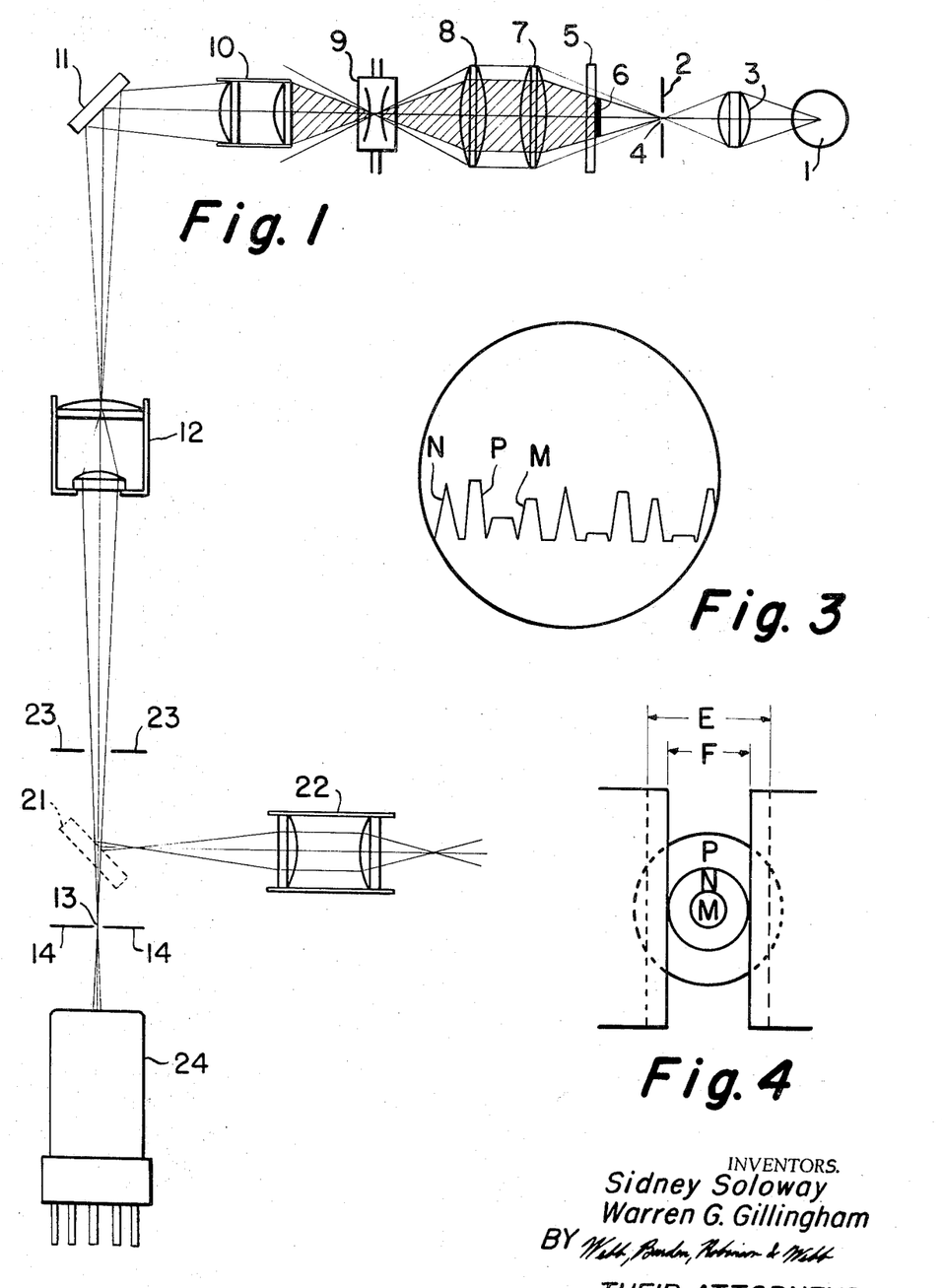
FIG. 1 is a diagrammatic drawing of a certain presently preferred embodiment of our invention showing a system of lenses for magnifying and focusing light scattered from particles in a cell.
FIG. 3 is a diagrammatic view of an oscilloscope picture showing pulses generated under our invention.
FIG. 4 is a diagrammatic view of three superimposed particle images between two slit gates.

In FIG. 1, light from lamp 1 is concentrated on diaphragm 2 by means of lens 3. A small opening 4 in the diaphragm provides a pinpoint source of light which strikes dark stop 5. A circular opaque disk 6 in the center of the dark stop absorbs all of the light except a ring-shaped band around the edge of the opaque spot. Two lenses 7 and 8 focus this band at the center of the narrow passage of transparent cell 9. A liquid or gas in which the particles to be analyzed are suspended is continuously passed through cell 9. If there is no particle at the focal point, no light enters lens system 10. If there is a particle at the focal point, it scatters the light so that some light enters lens system 10. To explain more clearly, if one were to place his eye at the position of lens system 10, he would see only darkness since the lens of his eye would be in the dark center of the conical band of light. But when a particle enters the focal point of the conical band in cell 9, it scatters light which strikes his lens; the lens then focuses the scattered light on his retina and he "sees" the particle. Light leaving lens system 10 is reflected from mirror 11 which helps to make the apparatus more compact; the light then passes through lens system 12. Lens systems 10 and 12 magnify and focus the light so that the image 13 of the particle appears at adjustable vertical slit gates 14.

The focal point of the light in the cell through which the particles pass is generally not a pinpoint since it is difficult to focus the light to a pinpoint; rather the focal point will be a uniform area of light larger than the particles. Since the particles will scatter light for as long as they are in the focal point, they will produce a moving image between the slit gates, which preferably moves a perpendicular to the slit gate opening. Although our invention is specifically applicable to moving images, it will work equally as well with images which have their centers at a known position such as along a known line or at a known point. Such a result may be obtained, for example, by using fluid focusing techniques well known in the art.

Figure 2:
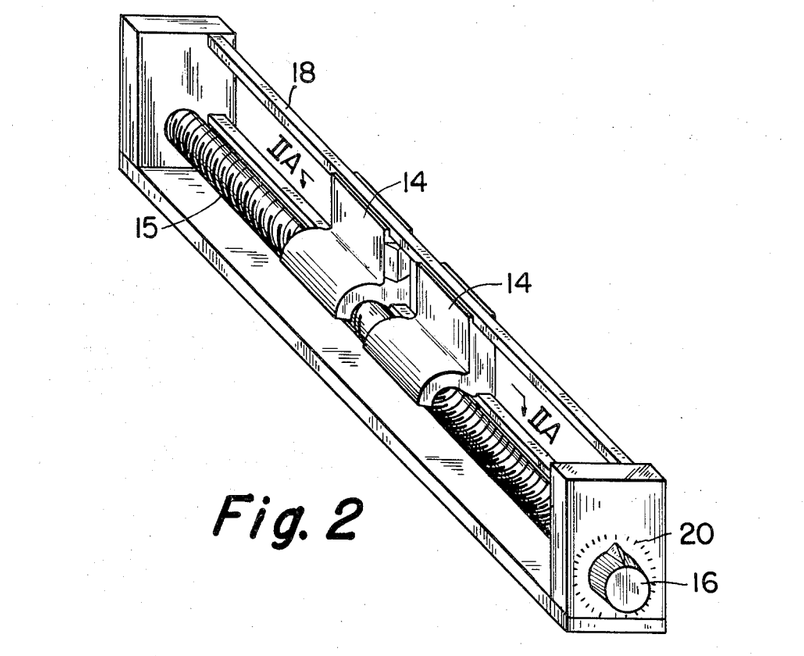
FIG. 2 is an isometric view of the adjustable slit gates shown in FIG. 1.
Figure 2A:
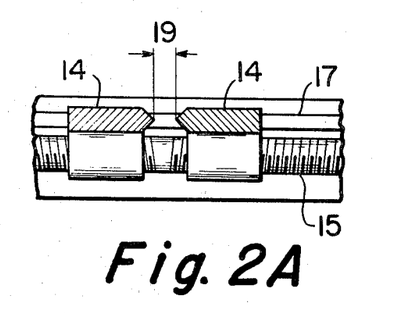
FIG. 2A is a view through IIA—IIA in FIG. 2.

Referring to FIGS. 2 and 2A, adjustable vertical slit gates 14 move uniformly in opposition to each other. Slit gates 14 ride on a screw rod 15 which is half threaded clockwise and half counterclockwise. The base of each slit gate is also threaded so that turning the screw rod with knob 16 moves each gate an equal amount in opposite directions. Rods 17 and 18 support the slit gates. The slit distance 19 is read off gauge 20.

Referring now again to FIG. 1, a removable mirror 21 can be placed in the path of the light so that the light enters an eyepiece lens system 22. The various lenses of the apparatus can then be adjusted, so that the image 13 of the particle is at vertical slit gates 14. A set of horizontal slit gates 23 is used to keep out stray light. After the light is focused at the vertical slit gates, it enters a photomultiplier 24, which generates a current proportional to the amount of light striking it.

Thus, a pulse of current is generated in the photomultiplier circuit each time a particle enters the focal point in cell 9. This current produces a voltage across a resistance in the photomultiplier circuit which is proportional to the size of the particle. We can, therefore, count the number of particles in each milliliter of fluid which generate pulses of current generating voltages within certain ranges or voltage "windows." Particles generating voltages within a certain voltage window lie within a correspondingly limited range of sizes. This count can be made by automatic electrical devices and can be visually illustrated by an oscilloscope.

FIG. 3 illustrates a series of pulses on an oscilloscope; the larger the voltage, the higher the peak and the longer the pulse, the wider the peak. The slit gates have been adjusted so that the slit distance is slightly less than the image size of the larger particles in the fluid.

In FIG. 4, an image of size M moving from left to right will generate a peak voltage for the time required for the image to cross the slit distance; this results in the flat top of the peak M on the oscilloscope in FIG. 3. An image of size N, in FIG. 4, equal to the slit distance, will produce a sharp peak N in FIG. 3. An image of size P, in FIG. 4, larger than the slit distance, will produce a peak P in FIG. 3. Peak P has an approximately flat top since most of its light has been cut off by the slit gates as it moves across them. Peak P is slightly higher than peak N because image P is larger than image N even when the slit gates cut off some of image P.

Figure 5:
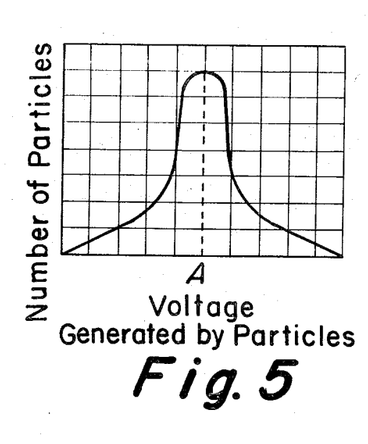
FIGS. 5, 6, 7, and 8 show curves used in explaining our invention.

If the sample particles are of a typical industrial product, the particle sizes will vary considerably. But, if the sample particles are of the "monosized" variety, such as red cells or pollen, the sizes will tend to be somewhat normally distributed as is illustrated by FIG. 5. Most of the particles will have a size lying near peak A, and fewer and fewer particles will have very large or small sizes; A is a modal average. The distribution of particle sizes can be approximately determined by using voltage windows—a count is made of the number of particles generating 0 to ½ volts, the number generating ½ to 1 volt, etc. until the entire distribution is obtained. The distribution is an electrical representation of particle size in that it is in terms of the voltages generated by the particles.

Figure 6:
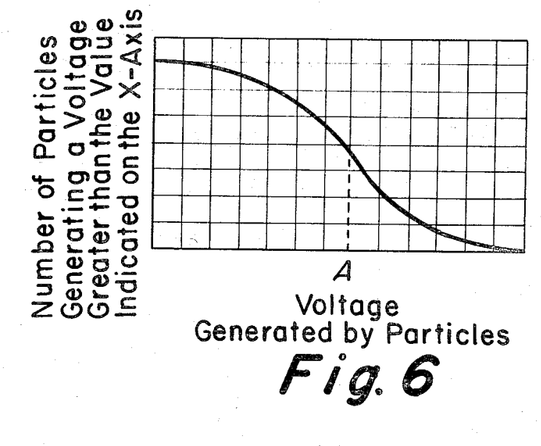

An alternative method of showing the distribution in terms of the voltages generated by the particles is illustrated by FIG. 6. Here, a count has been made of a number of particels generating a voltage greater than each voltage value shown on the X axis. Nearly all the particles generate voltages greater than the very lowest voltage values and very few generate voltages greater than the higher voltage values. That part A of the curve where the number of particles counted is falling most rapidly, corresponds to peak A of the curve shown in FIG. 5.

Figure 7:
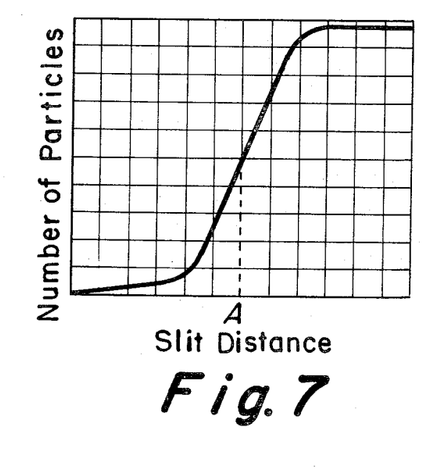

Our invention is applicable to both industrial and monosized samples and is practiced in the following manner. The voltage window is set so that the only particles counted are those which generate voltages at or very near peak A of the curve in FIG. 5. The adjustable slit gates are first opened and then they are very slowly closed (or, alternatively, they can be first closed and then very slowly opened). The particle count per milliliter is recorded and plotted against the distance between the slit gates as shown in FIG. 7. At first, the slit distance is much larger than the image size and the number of particles remains high as in the right portion of the curve. As the slit disance becomes less than the image size, less light enters the photomultiplier and, therefore, lower voltages are generated. If the voltage generated is less than the minimum permitted by the voltage window the particles will not be counted. This results in a rapid decrease in the number of particles counted as is illustrated by the curve at A in FIG. 7; A in FIG. 7, therefore, corresponds to A in FIG. 5. The size of the particles at peak A is determined by reading the slit distance off the slit gauge and dividing by the magnification of the image.

In actual practice, a slight increase in the number of particles counted may occur just before the rapid decrease. This is due to the fact that there are probably particles in the fluid which are larger than size A particles. These larger particles are at first not counted because they generate voltages in excess of the maximum permitted by the voltage window. But when the slit gates cut into their images, light is diverted from the photomultiplier, the voltages generated fall within the window, and the larger particles are counted. This "large particle effect" does not significantly affect the determination of peak A.

A determination of the size of the particles at other points on the distribution curve of FIG. 5 can be made in several ways. First, one may set the voltage window so that the only particles counted are those generating voltages at or very near a certain point on the distribution curve. The slit distance is decreased as before and the slit distance at which the particle count most rapidly decreases is again noted as the point on the distribution curve. However, for some particle sizes, the larger particle effect noted in the previous paragraph may tend to obscure the point of most rapid particle count decrease.

The following method avoids some of the problems caused by the large particle effect. The slit distance is first set at some value E which is less than the image size of the largest particles in the fluid. The voltage recording device is set so that a count is made of the number of particles generating a voltage greater than each value shown on the X axis, as was done in FIG. 6. The result is the curve marked R in FIG. 8. The experiment is then repeated with the slit distance set at a slightly lesser value F, resulting in curve S of FIG. 8. Curve S touches curve R at a voltage B. We conclude that voltage B corresponds to slit distance F.

Figure 8:
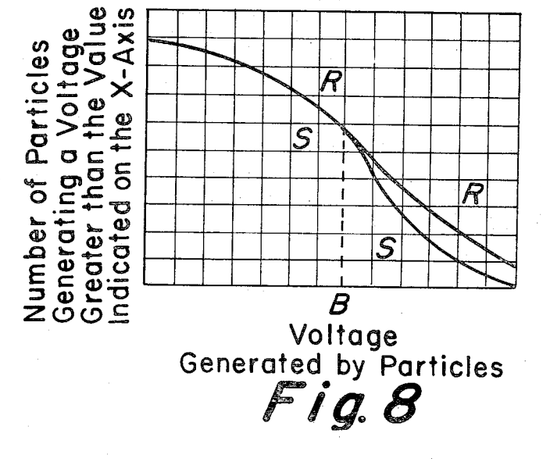

An explanation may best be obtained by consulting FIG. 4. The slit distance is set at F and the images of three particles M, N, and P are superimposed. Note first that a particle such as P which has an image size greater than slit distance F will still transmit more light to the photomultiplier than a particle such as N which has an image size equal to the slit distance F. (All images are of approximately equal and uniform intensity for a particular type of particle.) This is why curve S, in FIG. 8, is not vertical along the dotted line at B—particles such as P still generate voltages higher than voltage B. Note, however, that whether the slit distance in FIG. 4 is E or F, particles N and M, which are of size F or smaller, will be unaffected and, therefore, coinciding curves will be produced for all particles having images less than size F. We conclude that the voltage B, at which curves R and S coincide, corresponds to slit distance F. Since we know the count at voltage B from a distribution curve such as in FIG. 5, we have obtained a point on the distribution curve. By generating the "greater than" curves of FIG. 8 for a series of slit distances, one can construct a distribution curve similar to FIG. 5 in terms of mechanically measured sizes instead of in terms of voltages generated. Thus, the X axis of FIG. 5 could be made to read in microns instead of voltages.

Particles having a size of about one micron are not much larger than the wavelength of visible light. Because of this, their images may be surrounded by diffraction rings for which one must correct. This problem can be alleviated somewhat by using light of higher frequencies, such as ultraviolet light.

Our invention can also be used to indicate the shape of particles. Particles which are rod-shaped, for example, can be made to generate lower voltages when the particles are sent through the cell aligned longitudinally in the direction they are moving than when they are aligned in any other direction or are unaligned. A rod-shaped particle image lying horizontally is sent horizontally across vertical slit gates. The slit distance is made slightly less than the length of the particle and the voltage generated is noted. If the image or the slit gates are rotated to an angle other than horizontal (preferably 90° to horizontal), more light will pass through the slit gates and higher voltages will be generated. Therefore, if lower voltages are generated when particles are aligned than when they are unaligned, the particles are rod-shaped. Note also that unaligned particles which have sharp peaks N in FIG. 3 at a certain slit distance will have flat peaks M when aligned.

A determination of both the length and width of a rod-shaped particle may be obtained in the following manner. The particles are sent through the cell aligned longitudinally in the direction they are moving. The length of the particles is determined by decreasing the slit distance between the vertical slit gates until the voltage generated drops off rapidly or until sharp peaks are exhibited on the oscilloscope. Horizontal slit gates 23 in FIG. 1 are placed approximately at image 13. The horizontal slit gates are now of an adjustable variety and the slit distance between them can be read from a gauge. The width of the particle is determined by slowly decreasing the slit distance between the horizontal slit gates until a sharp drop in the voltage generated is again observed.

Figure 9:
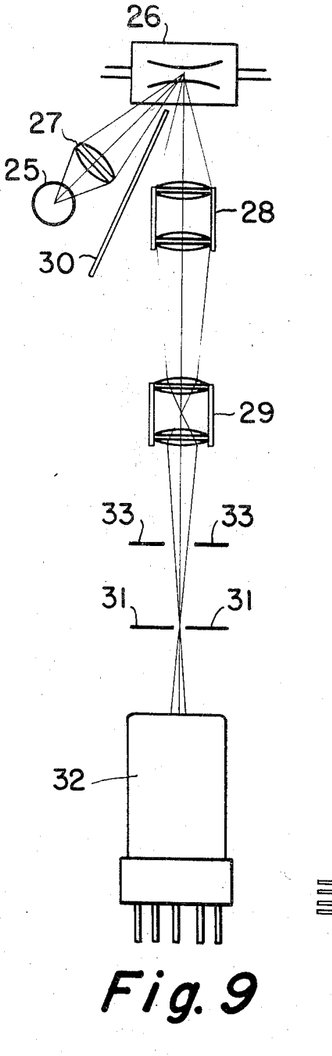
FIG. 9 illustrates another embodiment of our invention similar to FIG. 1.

A variation of the apparatus of FIG. 1 is shown in FIG. 9. Light from source 25 is focused in the center of the narrow passage of cell 26 by lens 27. If a particle is at the focal point, light is scattered into lens systems 28 and 29. A shield 30 prevents stray light from entering the lens systems. These two lens systems magnify the light and focus an image of the particle between horizontal slit gates 31. The light then enters photomultiplier 32 where it generates an electric current as before. Vertical slit gates 33 keep out stray light.

Figure 10:
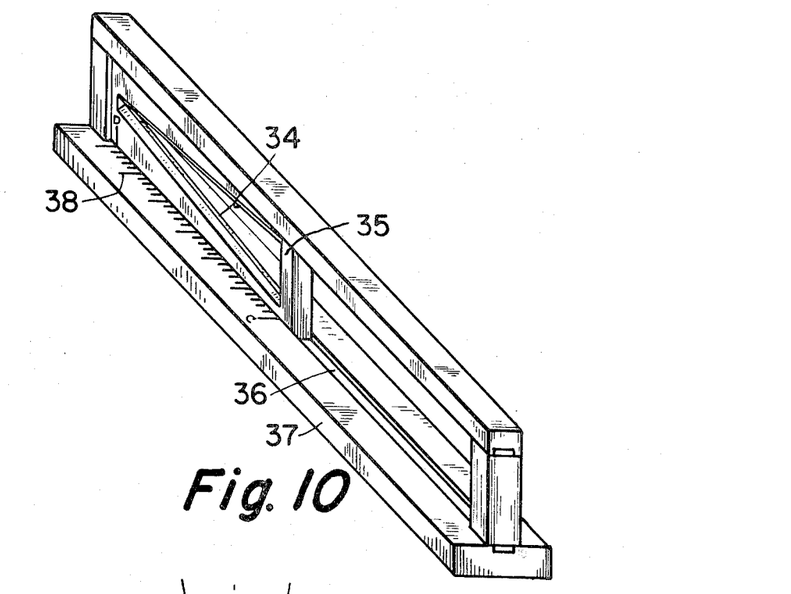
FIG. 10 is an isometric view of another type of adjustable slit gate.

FIG. 10 shows a variation in the type of slit gates used. In FIG. 10, the slit gates 34 are non-parallel; they touch at one end and are open at the other end by an amount just larger than the largest particle images. The slit gates are mounted on a slide 35, which rides in a groove 36 of mounting frame 37. The slit distance at C is found by reading the point at which mark D on the slide touches scale 38.

Figure 11:
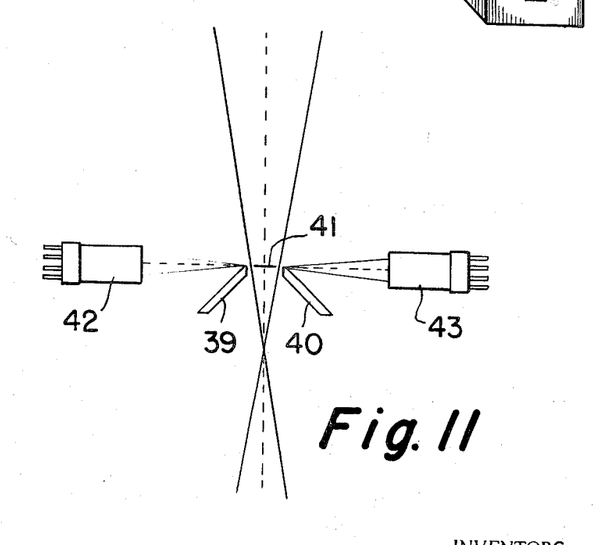
FIG. 11 is a diagrammatic view of still another type of slit gate arrangement.

FIG. 11 illustrates another form of slit gate arrangement. Here, the gate consists of two mirrors 39 and 40 which move uniformly horizontally in opposition. When the mirrors enter the image 41 of the particle, light is reflected into photomultipliers 42 and 43.

Each photomultiplier generates a separate pulse. If the image moves from left to right, photomultiplier 42 will generate a pulse and then photomultiplier 43 will generate a pulse. If the time between the end of the first pulse and the beginning of the second pulse is reduced to zero by decreasing the slit distance, then the slit distance will equal the image size. Alternatively, the image size can be found by decreasing the slit distance until the base line between the pulses moves up. If the image is centered between the mirrors, the size of the image is found by simply decreasing the slit distance until pulses are generated.

In a variation of FIG. 11, the photomultiplier 42 is replaced with a mirror which reflects light into photomultiplier 43 when mirror 39 touches the image. Thus, instead of the two mirrors 39 and 40 closing a horizontally moving image, a vertically moving image is used and is moved to the left until it touches mirror 39, generating a signal in the photomultiplier 43. The mirror which replaced photomultiplier 42 is then removed and mirror 40 is moved to the left until it touches the image and another signal is generated in photomultiplier 43. The slit distance will then equal the image size.

Replacing photomultiplier 42 with a mirror is also applicable to horizontally moving images. Two consecutive pulses will be generated in photomultiplier 43. The size of the image can be found by decreasing the slit distance until the time between the end of the first pulse and the beginning of the second pulse is reduced to zero or until the base line between the pulses moves up.

Other apparatus variations are also possible within the scope of this invention. The optical portion of the apparatus may employ an entirely different positioning of lights and lenses; it is only required that images of the particles in the fluid be formed at a place where light forming the images can be diverted with some mechanical means. The place of image formation could be a predetermined point with image centered on the point. It could be along a line or at any other place where a mechanical device can divert the light of the image. Preferably, the images are magnified. A series of apparatuses similar to the apparatus shown in FIG. 1, each set employing a different slit distance, may be used consecutively on the same sample in order to completely analyze a sample in one operation; elements of the apparatus may be shared between each setup.

A slit gate may be any mechanical device which can divert light from the images of the particles. Although there will usually be two gates in parallel, this need not be the case; non-parallel gates were illustrated in FIG. 10. If the particle images are all centered at a known position such as a point or along a line which is parallel to a slit gate, then only one slit gate need be used and the radius of the image can be determined. Either or both of the slit gates may be moveable. The slit gates may also be made rotatable or the image may be rotated.

Also required is a means for determining when the slit gates have entered the images of the particles, that is, a means for detecting the diversion of light. This will usually be some type of photoelectric device, and is preferably a photomultiplier.

Finally, it is necessary to have a means for determining the slit distance when the slit gates are at the edges of the image of the particle. It is preferable, however, to know the slit distance at all times.

The following is a description of several experiments in which we have determined particle sizes using the apparatus and methods of our invention.

EXAMPLE I

Mulberry tree pollen was suspended in water at a concentration of about 8,000 particles per ml. Microscopic examination of the particles showed their size to be about 12 to 13 microns. The suspension was drawn through a microcounting chamber having a channel 0.013 inch wide and 0.003 inch deep by a synchronous drive syringe pump at a rate of ½ ml. every 20 seconds. Light was focused on the channel and, using optics similar to those shown in FIG. 1, particle images were formed at a micrometer slit adjustment. The light then entered a photomultiplier which sent pulses to a pulse height analyzer where the peak was determined to be between 4 and 4½ volts.

Figure 12:
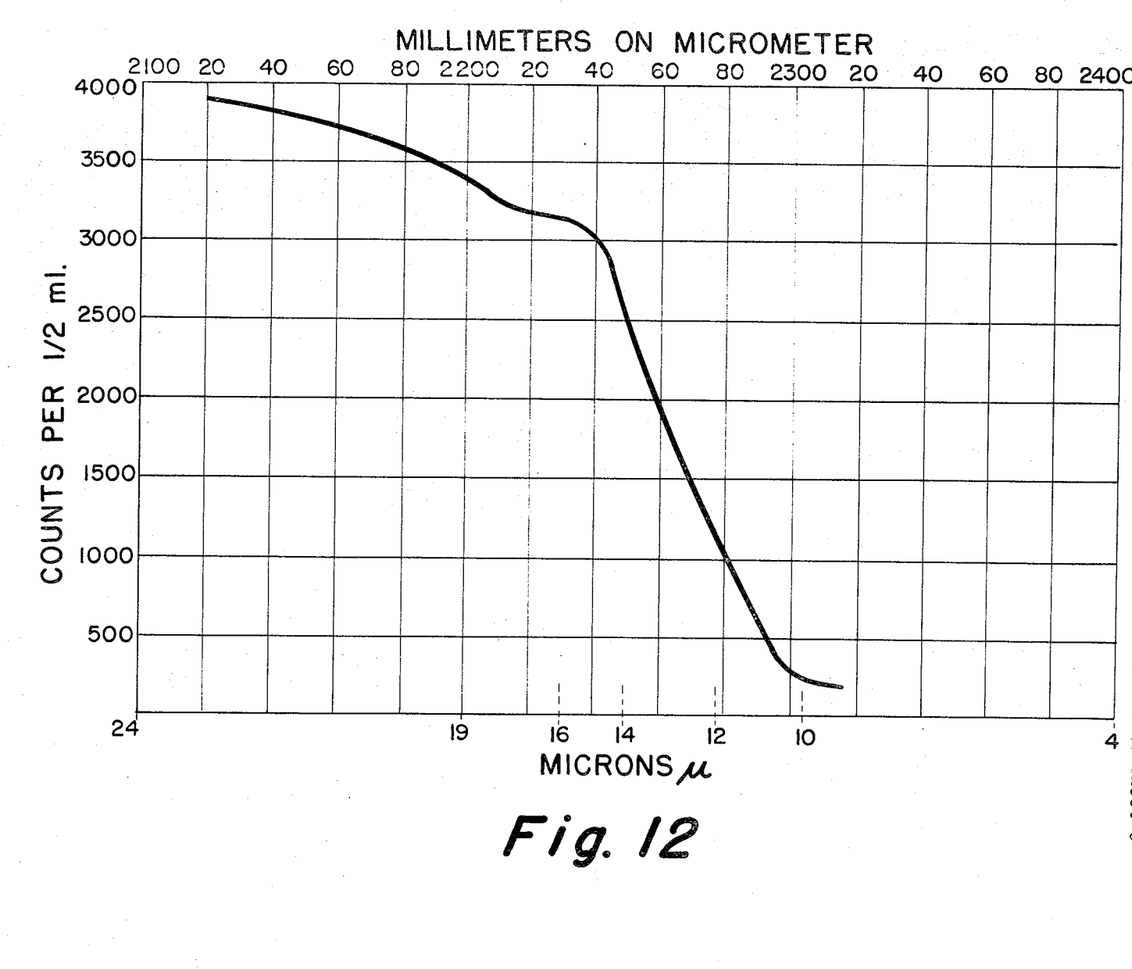
FIGS. 12, 13, and 14 are curves resulting from actual experiments.

The pulse height analyzer was then set to count only pulses having voltages between 4 and 4½ volts. The slit distance was slowly decreased and pulse counts were made at various slit distances. FIG. 12 shows the resulting curve. The steepest portion of the curve is at about 13 microns which agrees with the microscopic determination of the particle size.

EXAMPLE II

Figure 13:
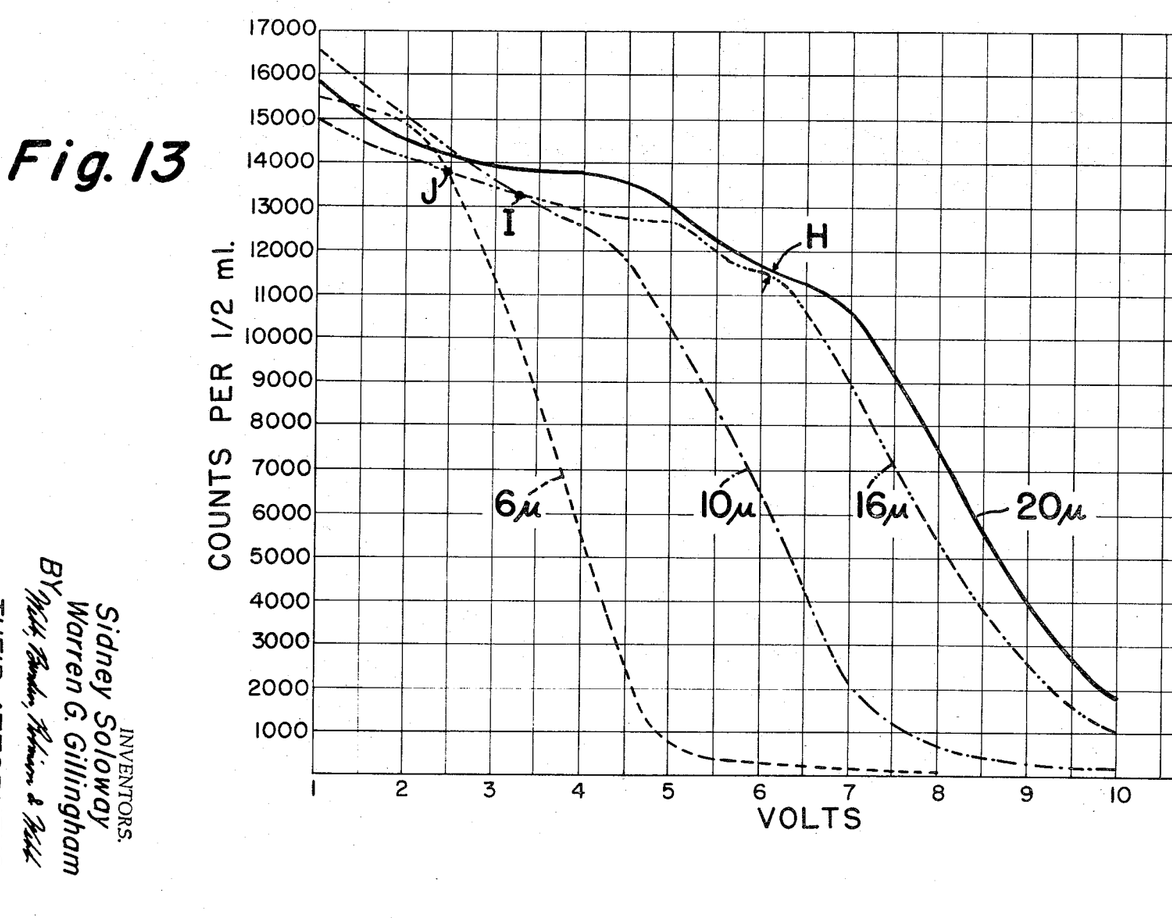

The mulberry tree pollen used in Example I was suspended in water at a concentration of about 30,000 particles per ml. The same apparatus was used that was used in Example I. The slit distance was set at 20 microns. The pulse height analyzer was set so that a count was made of the number of particles generating voltages greater than the values shown on the X axis of FIG. 13. The resulting curve is marked "20μ." The procedure was repeated using slit distances of 16, 10, and 6 microns resulting in the curves marked "16μ," "10μ," and "6μ," respectively. The 16 and 20 micron curves approximately coincide at H. Therefore, 16 microns corresponds to 6 volts and there are about 11,500 particles per ½ ml. having sizes greater than 16 microns. Referring to a distribution curve in terms of volts, the count at 6 volts (or 16 microns) was determined to be about 500 particles per ½ ml. Thus, 16 microns and 500 particles per ½ ml. is one point on a distribution curve in terms of microns. In a similar manner I and J, in FIG. 13, determined other points on the distribution curve.

EXAMPLE III

Industrial aluminum metal powder was sieved to remove particles greater than 44 microns; a water suspension was formed. The slit distance was set at 50 microns and a particle count was made at ½ volt windows from 0 to 10 volts. The result is the curve marked "50μ" in FIG. 14, using the left vertical scale marked "Particles Counted Per ½ ml.," and the lower horizontal scale marked "Volts." Since the slit distance was greater than the largest particle size, this curve represents the distribution of the particles.

Figure 14:
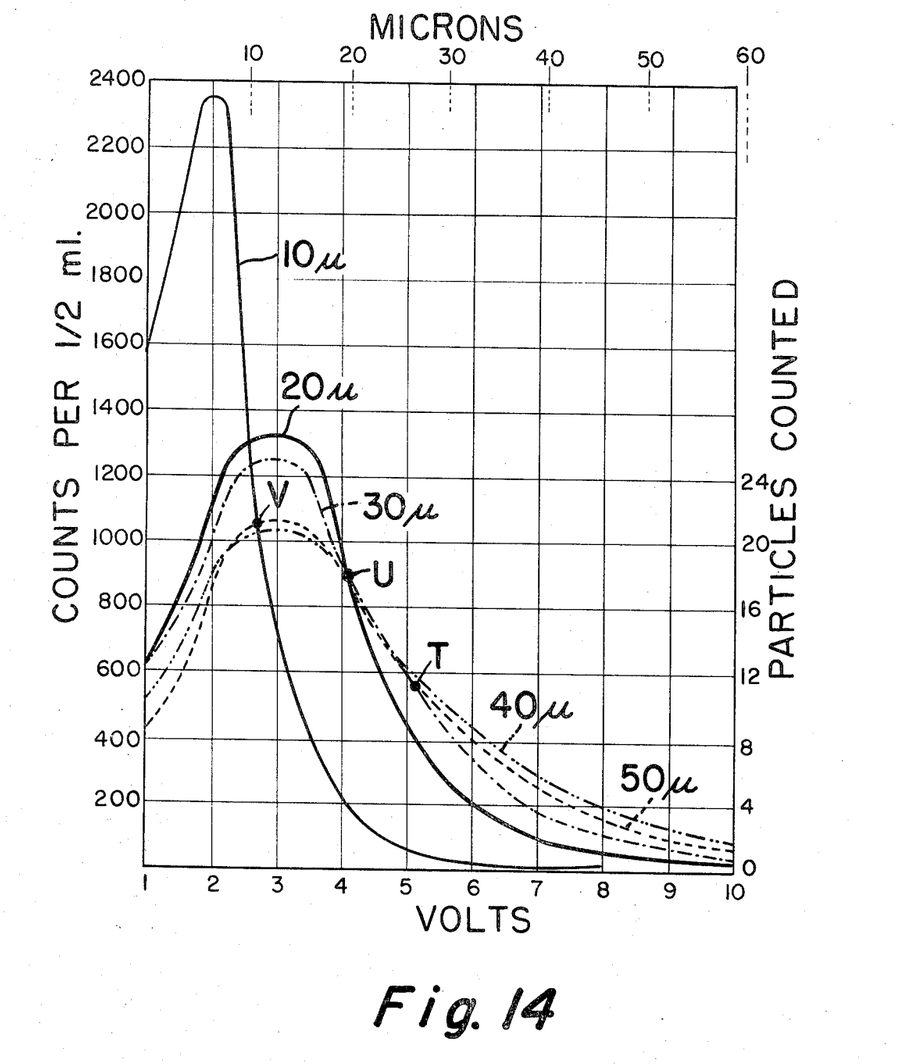

A count was also made from 0 to 10 volts at ½ volt windows with the slit distance at 40, 30, 20, and 10 microns resulting in the curves in FIG. 14 marked "40μ," "30μ," "20μ," and "10μ," respectively.

The curves are normalized in that over the entire range from 0 to 10 volts approximately the same total number of particles are counted at each slit distance and, therefore, the area under each curve is approximately the same. (There is, however, a small tendency for the apparatus not to count out-of-focus images at small slit distances.)

A random count of particle sizes was made under a microscope on a sample of the aluminum powder. The right vertical scale marked "Particles Counted" gives the number counted and the upper horizontal scale marked "Microns" gives the particle size. The mean size was found to be 20 microns.

Note that the peaks for the curves having slit distances of 20 microns or more are all at about 3 volts. This means that the modal sized particle must be less than 20 microns. The peak of the 10 micron curve has moved to about 2 volts. Therefore, the modal particle size must be larger than 10 microns.

The voltage at the point where the "50μ" micron curve is crossed by another curve corresponds approximately to the slit distance used for the other curve. That is, the voltage at the point T where the 30 micron curve crosses the 50 micron curve should be about 30 microns; the microscopic examination (see upper horizontal scale) shows that this is approximately correct. The points U and V, corresponding to about 20 and 10 microns, respectively, also agree with the microscopic examination. FIG. 14 shows that this approximation was very good in this experiment.

From the foregoing it may be seen that this invention provides a method and apparatus for determining the size and shape of small particles suspended in a fluid.

While we have described our invention in terms of the presently preferred embodiments, it may be otherwise embodied within the scope of the following claims.

We claim:
1. An apparatus for determining the size of particles suspended in a fluid comprising:
   (A) a source of light;
   (B) a cell through which said particles suspended in said fluid flow;
   (C) means for directing light along an axis to a known position in said cell from said source to illuminate said particles in said cell where said particles scatter light;
   (D) at least one lens having a focal point and positioned on said axis to focus light scattered by said particles and to form images of a particle centered at said known position;
   (E) means positioned on said axis for preventing unscattered light from entering said lens;
   (F) mechanical means positioned adjacent said axis and at the focal point of said one lens and movable into and out of said images of the particle to divert light forming said images;
   (G) means for detecting light from said images transmitted beyond the mechanical means to indicate when a particle is at said known position; and
   (H) means for measuring the distance between said mechanical means and said axis, the size of the particle being proportional to the distance between said mechanical means and said axis when the mechanical means is positioned at the edge of said images.

2. An apparatus for determining the size of particles suspended in a fluid comprising:
   (A) a source of light;
   (B) a cell through which said particles suspended in said fluid flow;
   (C) means for directing light along an axis to a known position in said cell from said source to illuminate said particles in said cell whereby said particles scatter light;
   (D) at least one lens having a focal point and positioned on said axis to focus light scattered by said particles and to form images at the focal point of said one lens of a particle centered at said known position;
   (E) means positioned on said axis and for preventing unscattered light from entering said lens;
   (F) two mechanical means, each of which is positioned adjacent said axis and on an opposed side of said images of the particle and are movable into and out of said images of the particle to divert light forming said images of the particle;
   (G) means for detecting light from said images of the particle transmitted beyond the two mechanical means to indicate when a particle is at said know position; and
   (H) means for measuring the distance between said two mechanical means, the size of the particle being proportional to the distance between said two mechanical means when the two mechanical means are positioned at opposed edges of said light images of the particle.

3. The apparatus of claim 2 wherein said means for detecting light is a photoelectric cell whereby a change in the output of the photoelectric cell indicates said light from said images of the particle.

4. The apparatus of claim 2 wherein said two mechanical means are rotatable whereby a second dimensional determinations of particle shape can be made.

5. The apparatus of claim 2 further including two additional mechanical means positioned each on opposed sides of said images substantially perpendicular to said original two mechanical means and said two additional mechanical means being movable into and out of said images to divert light forming said images.

6. A method of determining the size of a particle suspended in a fluid comprising:
   (A) forming a light image of said particle at a known magnification and along an axis at a known position in front of a means for detecting the light image;

(B) diverting light from said image by introducing a mechanical means into said image so that at least a portion of said light does not pass to said detecting means;

(C) detecting the light which passes beyond the mechanical means in order to determine whether a portion of said light is diverted by said mechanical means and to indicate that said particle is at said known position;

(D) withdrawing said mechanical means from said image until no further diversion of light is determined; and (E) measuring the distance between said mechanical means and said axis, dividing said distance by the magnification of said image, and multiplying the quotient by two whereby the diameter of the particle is determined.

7. A method of determining the size of a particle suspended in a fluid comprising:

(A) forming a light image of said particle at a known magnification and along an axis at a known position in front of a means for detecting the light image;

(B) simultaneously diverting light from two substantially opposite sides of said image by introducing a mechanical means into each of said sides so that at least a portion of said light does not pass to said detecting means;

(C) detecting light which passes beyond the mechanical means in order to determine whether a portion of said light is diverted by said mechanical means and to indicate that said particle is at said known position; and (D) withdrawing said mechanical means from said image until no further simultaneous diversion of light is determined; and (E) measuring the distance between said two mechanical means and dividing said distance by the magnification of said image whereby the diameter of the particle is determined.

8. A method of indicating the shape of particles suspended in a fluid comprising:

(A) forming consecutive light images of said particles, said images being substantially aligned longitudinally in an axial direction and positioned in front of means for detecting said light images;

(B) simultaneously diverting light forming two substantially opposite sides of said images by introducing a mechanical means into each of said sides so that at least a portion of said light does not pass to said detecting means;

(C) withdrawing said mechanical means from said images until a substantial decrease in the simultaneous diverting of said light is noted;

(D) measuring the amount of said light blocked;

(E) forming consecutive light images of said particles, said images not being substantially longitudinally aligned in an axial direction and positioned in front of means for detecting said light images;

(F) simultaneously diverting light forming two substantially opposite sides of said images by introducing a mechanical means into each of said sides so that at least a portion of said light does not pass to said detecting means;

(G) withdrawing said mechanical means from said images until a substantial decrease in the diversion of said light is noted;

(H) measuring the amount of said light diverted; and (I) comparing the amount of light measured in step (D) to the amount of light measured in step (H).

9. A method of determining the shape of a particle suspended in fluid comprising:

(A) forming a light image of said particle at a known magnification, said image being substantially aligned in an axial direction and positioned in front of means for detecting said light image;

(B) simultaneously diverting light forming two substantially opposite sides of said image by introducing a mechanical means into each of said sides so that at least a portion of said light does not pass to said detecting means;

(C) detecting the diversion of said light;

(D) withdrawing said mechanical means from said image until said diversion of said light is no longer detected;

(E) measuring the distance between said two mechanical means and dividing said distance by the magnification of said image;

(F) simultaneously diverting light forming two substantially opposite sides of said image by introducing a mechanical means into each of said sides so that at least a portion of said light does not pass to said detecting means, said diversions lying on a line substantially perpendicular to said axial direction;

(G) detecting the diversion of said light;

(H) withdrawing said mechanical means described in step (F) of this claim until said diversion of said light detected in step (G) of this claim is no longer detected; and (I) measuring the distance between said two mechanical means described in step (F) of this claim and dividing said distance by the magnification of said image.

10. A method of determining the average size of particles suspended in a fluid comprising:

(A) forming light images of a particle at a known magnification and along an axis at a known position in front of a means for detecting the light images;

(B) consecutively stepwise diverting amounts of light from said images with a mechanical means so that at least a portion of said light does not pass to said detecting means;

(C) measuring the amount of light passing beyond said mechanical means to said detecting means to determine the amount of light diverted at each step; and (D) measuring the distance between said mechanical means and said axis when said amount of light diverted changes most rapidly between steps, dividing said distance by the magnification of said images, and multiplying the quotient by two.

11. A method of determining the average size of particles suspended in a fluid comprising:

(A) forming light images of a particle at a known magnification and said light images being positioned in front of a means for detecting the light images;

(B) consecutively stepwise simultaneously diverting light from two substantially opposite sides of said images by introducing a mechanical means into each of said sides so that at least a portion of said light does not pass to said detecting means;

(C) measuring the amount of light passing beyond said mechanical means to said detecting means to determine the amount of light diverted at each step; and (D) measuring the distance between said two mechanical means when said amount of light diverted changes most rapidly between steps, and dividing said distance by the magnification of said images.

12. An apparatus for determining the size of particles suspended in a fluid comprising:

(A) a source of light;

(B) a cell through which said particles suspended in said fluid flow;

(C) means for directing light from said source along an axis to a known position in said cell to illuminate the particles in said cell whereby said particles scatter light;

(D) at least one lens having a focal point and positioned on said axis to focus light scattered by said particles centered at said known position and to form an image of a particle at the focal point of said lens;

(E) means for preventing unscattered light from entering said lens;
(F) a variable aperture positioned along the axis at the focal point and movable into and out of the image to divert light forming said image;
(G) means for detecting light from said image transmitted beyond the variable aperture whereby the diversion of light by the variable aperture can be determined; and
(H) means for measuring the size of the variable aperture, the size of the particle being proportional to the size of the variable aperture when the variable aperture is positioned at the edge of said image.

13. An apparatus for determining the size of particles suspended in a fluid in which an image of a particle is formed along an axis at a known position by means comprising a source of light, a cell through which said particles suspended in said fluid flow, means for directing light from said source upon the particles in said cell whereby said particles scatter light; at least one lens positioned to focus light scattered by said particles and to form an image of a particle along an axis at a known position, means for preventing unscattered light from entering said lens, the improvement comprising:
(A) a variable aperture positioned along the axis at the focal point of said one lens and movable into and out of the image to block light forming said image;
(B) means for detecting light from said image transmitted beyond the variable aperture to indicate when a particle is at said known position and whereby the diversion of light by the variable aperture can be determined; and
(C) means for measuring the size of the variable aperture, the size of the particle being proportional to the size of the variable aperture when the variable aperture is positioned at the edge of said image.

References Cited

UNITED STATES PATENTS

| | | | |
|---|---|---|---|
| 2,732,753 | 1/1956 | O'Konski | 356—103X |
| 2,812,686 | 11/1957 | Sinclair | 356—103 |
| 2,997,597 | 8/1961 | Mumma | 356—102X |
| 3,017,801 | 1/1962 | Ingber | 356—159X |
| 3,045,123 | 7/1962 | Frommer | 356—103X |
| 3,028,501 | 4/1962 | Lamparter | 356—157 |
| 3,084,591 | 4/1963 | Stephens | 356—102X |
| 3,153,727 | 10/1964 | Nathan | 356—102X |
| 3,193,689 | 7/1965 | Kerr | 356—159 |
| 3,248,551 | 4/1966 | Frommer | 356—103X |
| 3,361,025 | 1/1968 | Gaffard | 250—219DFX |

FOREIGN PATENTS

| | | | |
|---|---|---|---|
| 157,888 | 7/1954 | Autralia | 356—102 |
| 791,079 | 2/1958 | Great Britain | 356—102 |
| 1,291,841 | 3/1962 | France | 356—102 |
| 190,699 | 8/1956 | Germany | 356—103 |

RONALD L. WIBERT, Primary Examiner

W. A. SKLAR, Assistant Examiner

U.S. Cl. X.R.

250—218; 340—237; 356—103, 157

UNITED STATES PATENT OFFICE
CERTIFICATE OF CORRECTION

Patent No. 3,563,660    Dated February 16, 1971

Inventor(s) Sidney Soloway and Warren G. Gillingham

It is certified that error appears in the above-identified patent and that said Letters Patent are hereby corrected as shown below:

Column 2 Line 64 --a-- should be dele[ted]
Column 3 Line 65 --particels-- should read --particles--.

In the Claims: Claim 1 Column 8 Line 9 --where-- sho[uld] read --whereby--. Claim 1 Column 8 Line 13 after --images-- insert --at focal point of said lens--.
Claim 2 Column 8 Line 43 --and-- shou[ld] be deleted.
Claim 2 Column 8 Line 52 --know-- sho[uld] read --known--. Claim 4 Column 8 Li[ne] --determinations-- should read --dete[r]mination--. Claim 7 Column 9 Line 3[0] --detecting light-- should read --detecting the light--. Claim 7 Column Line 34 --and-- should be deleted. [Claim] 8 Column 9 Line 56 --blocked-- shoul[d] read --diverted--.

Signed and sealed this 13th day of July 1971.

(SEAL)
Attest:

EDWARD M. FLETCHER, JR.
Attesting Officer

WILLIAM E. SCHUYLER,
Commissioner of Paten[ts]